(12) United States Patent
Kawashima et al.

(10) Patent No.: US 10,227,894 B2
(45) Date of Patent: Mar. 12, 2019

(54) ROTARY SYSTEM

(71) Applicant: MITSUBISHI HEAVY INDUSTRIES COMPRESSOR CORPORATION, Tokyo (JP)

(72) Inventors: Hirokazu Kawashima, Hiroshima (JP); Tomoyuki Nishikawa, Hiroshima (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 452 days.

(21) Appl. No.: 14/894,273

(22) PCT Filed: Feb. 19, 2014

(86) PCT No.: PCT/JP2014/053921
§ 371 (c)(1),
(2) Date: Nov. 25, 2015

(87) PCT Pub. No.: WO2015/125239
PCT Pub. Date: Aug. 27, 2015

(65) Prior Publication Data
US 2016/0115824 A1 Apr. 28, 2016

(51) Int. Cl.
*F16C 35/063* (2006.01)
*F01D 25/16* (2006.01)
(Continued)

(52) U.S. Cl.
CPC .............. *F01D 25/18* (2013.01); *F01D 3/04* (2013.01); *F01D 5/026* (2013.01); *F01D 5/10* (2013.01);
(Continued)

(58) Field of Classification Search
CPC ... F01D 3/04; F01D 5/026; F01D 5/10; F01D 13/003; F01D 25/04; F01D 25/16;
(Continued)

(56) References Cited

U.S. PATENT DOCUMENTS 1,337,882 A * 4/1920 Bott ...................... F16C 35/077
101/248
3,890,780 A * 6/1975 Hagemeister ........... F01D 25/16
184/6.11
(Continued)

FOREIGN PATENT DOCUMENTS

CN 202417624 U 9/2012
CN 203175630 U 9/2013
(Continued)

OTHER PUBLICATIONS

Design of Machine Elements. Bhandari, V. B. New Delhi. Tata McGraw-Hill, 2008. p. 336. ISBN: 978-0-07-061141-2.*
(Continued)

*Primary Examiner* — Josh Skroupa
(74) *Attorney, Agent, or Firm* — Birch, Stewart, Kolasch & Birch, LLP

(57) ABSTRACT

A rotary system capable of maintaining a distance of separation between two rotary machines and inhibiting vibration in an intermediate shaft connecting rotary shafts of the two rotary machines to each other. The rotary system includes a first rotary machine having a first rotary shaft, a second rotary machine having a second rotary shaft, and an intermediate shaft device having an intermediate shaft main body having a first end portion connected to the first rotary shaft and a second end portion connected to the second rotary shaft and rotating about an axis and a plurality of bearing devices slidably supporting the intermediate shaft main body.

4 Claims, 2 Drawing Sheets

(51) Int. Cl.
*F01D 25/18* (2006.01)
*F01D 25/20* (2006.01)
*F02C 7/06* (2006.01)
*F16C 35/00* (2006.01)
*F01D 13/00* (2006.01)
*F01D 3/04* (2006.01)
*F01D 5/02* (2006.01)
*F01D 5/10* (2006.01)
*F01D 25/04* (2006.01)
*F01D 25/24* (2006.01)
*F02C 6/12* (2006.01)
*F04D 25/02* (2006.01)
*F04D 29/66* (2006.01)
*F04D 29/054* (2006.01)
*F04D 29/06* (2006.01)

(52) U.S. Cl.
CPC .......... *F01D 13/003* (2013.01); *F01D 25/04* (2013.01); *F01D 25/16* (2013.01); *F01D 25/162* (2013.01); *F01D 25/20* (2013.01); *F01D 25/243* (2013.01); *F02C 6/12* (2013.01); *F02C 7/06* (2013.01); *F04D 25/02* (2013.01); *F04D 29/054* (2013.01); *F04D 29/668* (2013.01); *F16C 35/00* (2013.01); *F05D 2240/52* (2013.01); *F05D 2240/54* (2013.01)

(58) Field of Classification Search
CPC ...... F01D 25/162; F01D 25/243; F01D 25/18; F01D 25/20; F02C 6/12; F02C 7/06; F04D 25/02; F04D 29/054; F04D 29/06; F04D 29/668; F05D 2240/52; F05D 2240/54; F16C 35/00; F16C 35/02; F16C 35/06; F16C 35/063; F16C 35/067
USPC ............................................ 464/170, 178, 7
See application file for complete search history.

(56) References Cited

U.S. PATENT DOCUMENTS

| | | | | |
|---|---|---|---|---|
| 4,101,241 A | * | 7/1978 | Kasuya | F01D 25/186 415/113 |
| 4,364,717 A | * | 12/1982 | Schippers | F01D 25/125 415/180 |
| 4,622,818 A | | 11/1986 | Flaxington et al. | |
| 4,786,238 A | | 11/1988 | Glaser et al. | |
| 4,810,108 A | * | 3/1989 | Yajima | F16C 35/067 384/488 |
| 5,785,493 A | * | 7/1998 | Ojima | F01D 11/122 415/173.1 |
| 6,206,786 B1 | * | 3/2001 | Ma | F16C 3/02 464/178 |
| 6,655,846 B2 | * | 12/2003 | Beckers | F01D 25/16 384/504 |
| 8,157,543 B2 | * | 4/2012 | Shimizu | F01D 25/166 417/407 |
| 8,308,431 B2 | * | 11/2012 | Ueno | F01D 25/16 415/178 |
| 8,366,379 B2 | * | 2/2013 | Bosen | F02C 6/12 415/14 |
| 8,814,499 B2 | * | 8/2014 | Kim | F04D 29/0516 415/145 |
| 9,988,984 B2 | * | 6/2018 | Ferranti | F02C 6/12 |
| 2005/0031243 A1 | * | 2/2005 | Yew | F16C 35/067 384/624 |
| 2005/0123417 A1 | * | 6/2005 | DelVecchio | F01D 5/025 417/407 |
| 2010/0119354 A1 | | 5/2010 | Bosen | |
| 2012/0039709 A1 | * | 2/2012 | Rauch | F01D 25/162 415/213.1 |
| 2012/0282084 A1 | * | 11/2012 | Boening | F01D 25/162 415/182.1 |
| 2013/0071243 A1 | * | 3/2013 | Kocher | F01D 25/18 415/230 |
| 2013/0177438 A1 | | 7/2013 | Farineau et al. | |
| 2013/0216354 A1 | | 8/2013 | Maruyama et al. | |
| 2014/0226925 A1 | | 8/2014 | Yoshino et al. | |

FOREIGN PATENT DOCUMENTS

| | | | | |
|---|---|---|---|---|
| CN | 203201605 U | | 9/2013 | |
| DE | 102007036912 A1 | | 2/2009 | |
| EP | 0037174 A1 | | 10/1981 | |
| EP | 2 133 579 A2 | | 12/2009 | |
| EP | 2186996 A2 | | 5/2010 | |
| EP | 1302636 B1 | * | 11/2014 | ............. F01D 25/16 |
| JP | 56-143817 A | | 11/1981 | |
| JP | 62-133934 U | | 8/1987 | |
| JP | 2002-303104 A | | 10/2002 | |
| JP | 2012-211623 A | | 11/2012 | |
| JP | 2013-79719 A | | 5/2013 | |
| JP | 2013-234675 A | | 11/2013 | |
| WO | WO 2007023835 A1 | * | 3/2007 | ........... F01D 15/005 |

OTHER PUBLICATIONS

Springer Handbook of Mechanical Engineering, vol. 10. Antonsson, et al. New York, New York. Springer Science and Business Media, 2009. p. 427. ISBN: 978-3-540-49131-6.*
Extended European Search Report for European Application No. 14882939.3, dated May 30, 2016.
Japanese Office Action for Japanese Application No. 2015-543982, dated Jun. 7, 2016, with an English translation.
International Search Report issued in PCT/JP2014/053921, dated Mar. 18, 2014.
Written Opinion of the International Searching Authority, issued in PCT/JP2014/053921, dated Mar. 18, 2014.
Chinese Office Action and Search Report for Chinese Application No. 201480030133.1, dated Mar. 23, 2016, with an English translation.
Office Action dated Mar. 8, 2017 in Counterpart EP Application No. 14882939.3.

* cited by examiner

ROTARY SYSTEM

TECHNICAL FIELD

The present invention relates to a rotary system.

BACKGROUND ART

A gas turbine as an example of rotary machines is configured to include a compressor that takes in and compresses air, a combustor that generates a high-temperature and high-pressure gas by injecting a fuel to the compressed air, and a turbine that is driven by the gas which is generated by the combustor. A single rotary shaft connects the compressor and the turbine to each other.

In general, it is desirable that the distance between the compressor and the turbine is set to be as short as possible so that the possibility of torsion or deflection in the rotary shaft is avoided.

The technique that is disclosed in, for example, PTL 1 is known in view of this requirement. According to the technique that is disclosed in PTL 1, respective output shafts of a motor, a compressor, and a clutch are configured to be connected to each other with couplings for the propagation of a rotational driving force.

CITATION LIST

Patent Literature

[PTL 1] Japanese Unexamined Patent Application Publication No. 2012-211623

SUMMARY OF INVENTION

Technical Problem

In some cases, however, a long distance of separation between the compressor and the turbine has to be ensured for maintenance-related requirements, restrictions in space, or the like. Although an extended rotary shaft may be connected with a coupling as in PTL 1 in such cases, this alone may cause vibration of the rotary shaft to become excessive and an instrument operation to become inconvenient.

The present invention has been made in view of these problems, and an object thereof is to provide a rotary system capable of maintaining a distance of separation between two rotary machines and inhibiting vibration in an intermediate shaft connecting rotary shafts of the two rotary machines to each other.

Solution to Problem

The present invention adopts the following means in order to solve the above problems.

A rotary system according to an aspect of the present invention includes a first rotary machine having a first rotary shaft, a second rotary machine having a second rotary shaft, and an intermediate shaft device having an intermediate shaft main body having a first end portion connected to the first rotary shaft and a second end portion connected to the second rotary shaft and rotating about an axis and a plurality of bearing devices slidably supporting the intermediate shaft main body.

According to this configuration, the first rotary shaft and the second rotary shaft are connected to each other via the intermediate shaft main body, and thus the distance of separation between the first rotary machine and the second rotary machine can be maintained.

In the rotary system according to another aspect of the present invention, a part of the intermediate shaft main body between the plurality of bearing devices may have a radial dimension exceeding a radial dimension of the other part of the intermediate shaft main body.

According to this configuration, an unstable vibration in the bearing devices can be inhibited.

The rotary system according to another aspect of the present invention may further include a lubricating oil supply unit supplying a lubricating oil and the lubricating oil supply unit may be connected to another lubricating oil supply unit of the first rotary machine and the second rotary machine.

According to this configuration, an existing lubricating oil supply system of the first rotary machine and the second rotary machine can be used.

The rotary system according to another aspect of the present invention may further include an exterior member disposed to cover both the intermediate shaft main body and the bearing devices.

According to this configuration, the lubricating oil can be prevented from scattering from the intermediate shaft main body. In addition, instrument safety can be improved because the rotating intermediate shaft main body does not have to be exposed to the outside.

In the rotary system according to another aspect of the present invention, a pair of radial bearings disposed apart from each other in the axial direction may constitute the plurality of bearing devices.

According to this configuration, a radial vibration is caught by the radial bearings, and thus the intermediate shaft main body can be stably supported.

In the rotary system according to another aspect of the present invention, the first rotary machine may be a turbine and may further have a thrust bearing disposed at a position contiguous to the first end portion.

According to this configuration, an axial vibration occurring in the first rotary shaft due to the rotation of the turbine as the first rotary machine is caught by the thrust bearing, and thus the intermediate shaft main body can be stably supported.

Advantageous Effects of Invention

The rotary system according to the present invention can maintain the distance of separation between the first rotary machine and the second rotary machine and inhibit vibration of the rotary shafts.

DESCRIPTION OF EMBODIMENTS

Hereinafter, the configuration of an intermediate shaft device 1 and the configuration of a rotary system 100 according to an embodiment of the present invention will be described with reference to accompanying drawings.

A gas turbine is an example of the rotary system 100 according to this embodiment.

Figure 1:
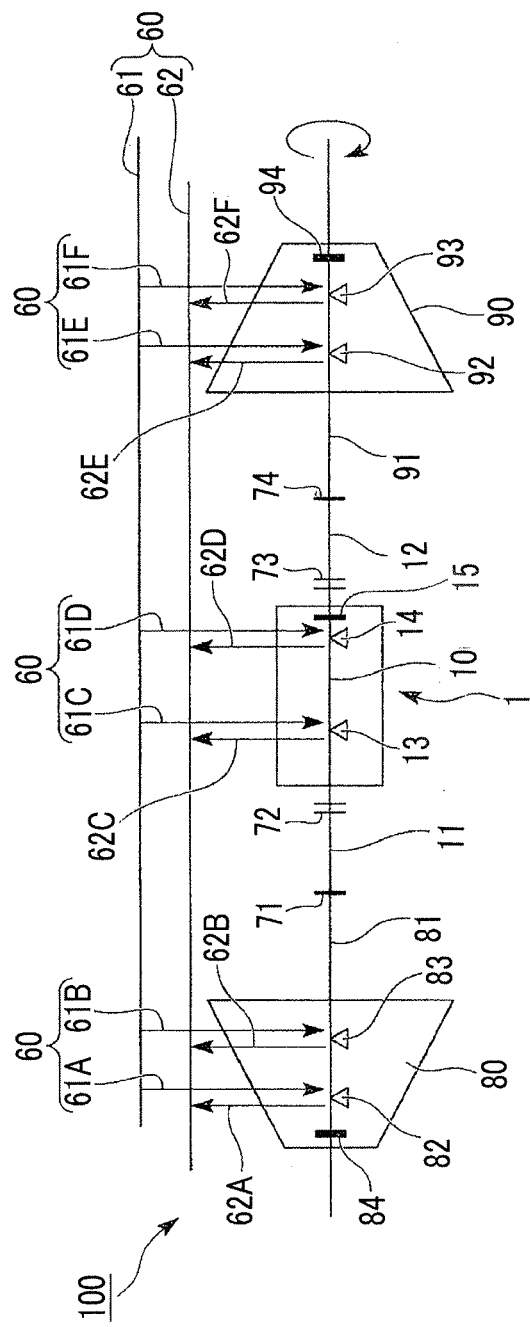
FIG. 1 is a schematic drawing of a rotary system according to this embodiment.

FIG. 1 is a schematic diagram illustrating the configuration of the rotary system 100 as the gas turbine. As illustrated in FIG. 1, the rotary system 100 is provided with a compressor 80 (first rotary machine) that takes in and compresses air, a combustor (not illustrated) that generates a high-temperature and high-pressure gas by injecting a fuel to the compressed air, a turbine 90 (second rotary machine) that is driven by the gas which is generated by the combustor, and the intermediate shaft device 1 that connects a rotary shaft of the compressor 80 and a rotary shaft of the turbine 90 to each other.

The intermediate shaft device 1 is disposed for the compressor 80 and the turbine 90 to be a predetermined distance apart from each other when the rotary system 100 is installed. This has to do with, for example, a case where a constant distance is desired to be maintained between the compressor 80 and the turbine 90 for maintenance-related requirements, restrictions in installation space, or the like.

The compressor 80 is provided with a first rotary shaft 81 that rotates about an axis. The first rotary shaft 81 is supported to be capable of rotating about the axis by two radial bearings 82 and 83 disposed at different axial positions in the compressor 80 and one thrust bearing 84.

The turbine 90 is provided with a second rotary shaft 91 that rotates about an axis. The second rotary shaft 91 is supported to be capable of rotating about the axis by two radial bearings 92 and 93 disposed at different axial positions in the turbine 90 and one thrust bearing 94.

The intermediate shaft device 1 is provided with an intermediate shaft main body 10 that rotates about an axis. The intermediate shaft main body 10 is supported to be capable of rotating about the axis by a pair of radial bearings 13 and 14 (bearing devices) disposed at different axial positions in the intermediate shaft device 1 and one thrust bearing 15 (bearing device) disposed at a position contiguous to the turbine 90 side.

The first rotary shaft 81, the second rotary shaft 91, and the intermediate shaft main body 10 extend collinearly.

A first buffer shaft 11 is disposed between the first rotary shaft 81 of the compressor 80 and the intermediate shaft main body 10 of the intermediate shaft device 1. Likewise, a second buffer shaft 12 is disposed between the intermediate shaft main body 10 of the intermediate shaft device 1 and the second rotary shaft 91 of the turbine 90.

The first rotary shaft 81 of the compressor 80, the second rotary shaft 91 of the turbine 90, and the intermediate shaft main body 10 of the intermediate shaft device 1 are integrally connected to each other via the first buffer shaft 11 and the second buffer shaft 12 and form a rotating body S.

Hereinafter, the configuration of the rotating body S will be described in detail.

The first rotary shaft 81 of the compressor 80 and the first buffer shaft 11 are connected to each other in the axial direction of the first rotary shaft 81 and the first buffer shaft 11 by a first coupling 71. The first coupling 71 connects the end portion of the first rotary shaft 81 on the turbine 90 side to the end portion of the first buffer shaft 11 on the compressor 80 side that is arranged to face the end portion in the axial direction. Preferably, the first coupling 71 is a barrel-shaped shaft coupling or a flange-type shaft coupling that is generally known as a form of shaft couplings. The barrel-shaped shaft coupling or the flange-type shaft coupling is frequently used in a case where the axes of two shafts connected to each other are arranged almost collinearly.

The end portion of the first buffer shaft 11 on the turbine 90 side is connected to the end portion of the intermediate shaft main body 10 of the intermediate shaft device 1 on the compressor 80 side via a second coupling 72. A known diaphragm coupling constitutes the second coupling 72. In a case where the shaft centers of two shafts connected to each other deviate from each other during rotation, the diaphragm coupling is used in order to absorb the deviation.

Likewise, the end portion of the second rotary shaft of the turbine 90 on the compressor 80 side is connected to the end portion of the second buffer shaft 12 on the turbine 90 side in the axial direction of the end portions by a fourth coupling 74. A barrel-shaped shaft coupling or a flange-type shaft coupling constitutes the fourth coupling 74 as is the case with the first coupling 71.

The end portion of the second buffer shaft 12 on the compressor 80 side is connected to the end portion of the intermediate shaft main body 10 of the intermediate shaft device 1 on the turbine 90 side via a third coupling 73. A diaphragm coupling constitutes the third coupling 73 as is the case with the second coupling.

The first rotary shaft 81, the second rotary shaft 91, the intermediate shaft main body 10, the first buffer shaft 11, and the second buffer shaft 12 are connected to each other as described above and form the rotating body S. The rotating body S integrally rotates in a predetermined direction while allowing axial and radial deviations. Accordingly, the rotary motion of the first rotary shaft 81 of the compressor 80 is propagated to the second rotary shaft 91 of the turbine 90 via the intermediate shaft main body 10 of the intermediate shaft device 1.

Hereinafter, a lubricating oil supply unit 60 that is disposed in the rotary system 100 will be described. As illustrated in FIG. 1, an oiling pipe 61 and an oil discharge pipe 62 constitute the lubricating oil supply unit 60. The oiling pipe 61 is connected to the radial bearings 13, 14, 82, 83, 92, and 93 via oiling pipe lines 61A, 61B, 61C, 61D, 61E, and 61F, respectively. In other words, the compressor 80, the turbine 90, and the intermediate shaft device 1 share the lubricating oil supply unit 60.

A lubricating oil that lubricates each of the bearings described above flows through the oiling pipe 61. The lubricating oil that flows through the oiling pipe 61 reaches the respective radial bearings 13, 14, 82, 83, 92, and 93 via the oiling pipe lines 61A, 61B, 61C, 61D, 61E, and 61F connected to the respective bearings. The radial bearings 13, 14, 82, 83, 92, and 93 are lubricated in this manner.

The lubricating oil used to lubricate the radial bearings 13, 14, 82, 83, 92, and 93 flows toward the oil discharge pipe 62 via oil discharge pipe lines 62A, 62B, 62C, 62D, 62E, and 62F. After reaching the oil discharge pipe 62, the lubricating oil is filtered by an oil filter (not illustrated) or the like. After being filtered by the oil filter, the lubricating oil flows back to the oiling pipe 61 and is provided for the lubrication of the respective bearings. In other words, the lubricating oil supply unit 60 of the rotary system 100 constitutes a pipe line that circulates in one predetermined direction.

Hereinafter, the configuration of the intermediate shaft device 1 will be described in detail with reference to FIG. 2. The left side in FIG. 2 is the compressor 80 side and the right side in FIG. 2 is the turbine 90 side.

Figure 2:
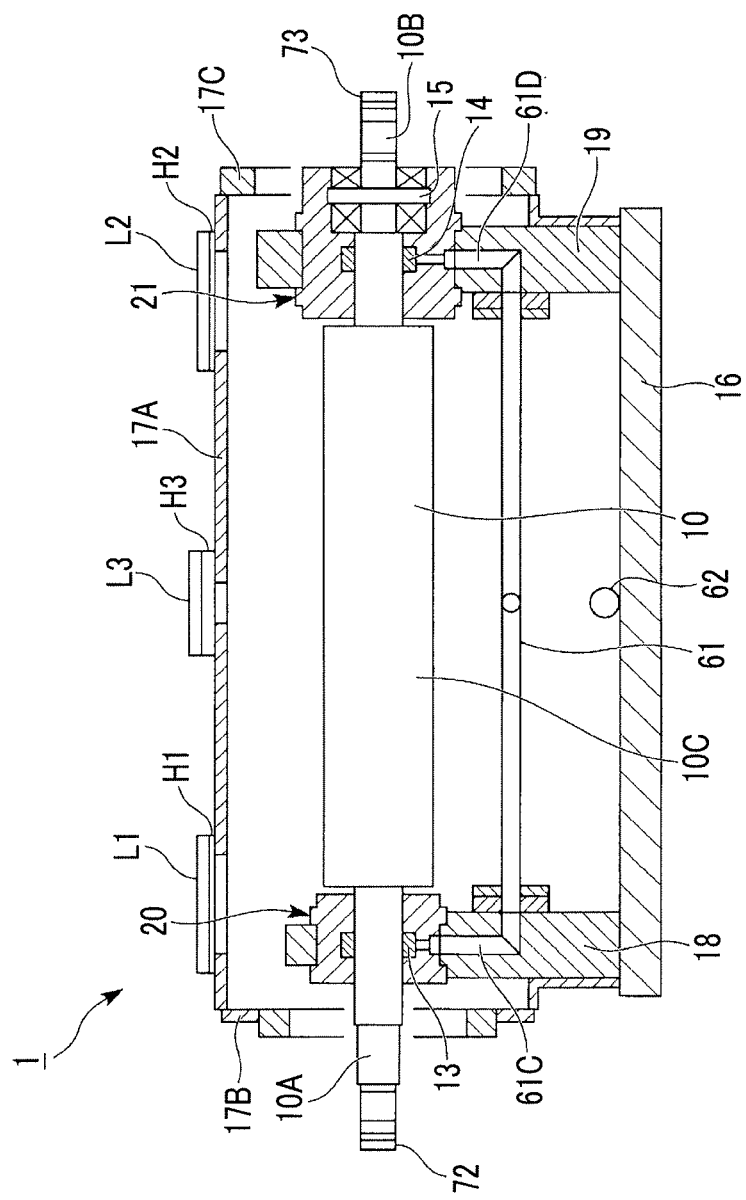
FIG. 2 is a schematic diagram illustrating the configuration of the rotary system according to this embodiment.

As illustrated in FIG. 2, the intermediate shaft device 1 has the intermediate shaft main body 10, the two radial bearings 13 and 14 that support the intermediate shaft main body 10 to be capable of rotating about an axis, the thrust bearing 15 on the turbine 90 side, a base 16 that supports these components from below, and an exterior member 17 that is fixed to the base 16, is formed to cover the entire intermediate shaft main body 10 from above, and has a substantially box shape.

The intermediate shaft main body 10 has a first shaft portion 10A that includes the end portion on the compressor 80 side (first end portion) and is supported by the radial bearing 13, a second shaft portion 10B that includes the end portion on the turbine 90 side (second end portion) and is slidably supported by the radial bearing 14 and the thrust bearing 15, and a large-diameter portion 10C that is disposed between the first shaft portion 10A and the second shaft portion 10B.

The first shaft portion 10A is formed to have a substantially cylindrical outer shape. The end portion of the first shaft portion 10A on the compressor 80 side is connected to the first buffer shaft 11 via the second coupling 72.

The second shaft portion 10B is a member that is similar in configuration to the first shaft portion 10A. The end portion of the second shaft portion 10B on the turbine 90 side is connected to the second buffer shaft 12 via the third coupling 73.

The large-diameter portion 10C is a member that has a cylindrical shape. The radial dimension of the large-diameter portion 10C is set to exceed the radial dimensions of the first shaft portion 10A and the second shaft portion 10B. The large-diameter portion 10C is disposed in order to increase the weight of the central region in the direction in which the intermediate shaft main body 10 extends. In other words, the large-diameter portion 10C is formed to be solid. In addition, the large-diameter portion 10C is formed to have a constant radial dimension in the axial direction.

The first shaft portion 10A, the second shaft portion 10B, and the large-diameter portion 10C that have the above-described configuration are integrally formed as the intermediate shaft main body 10.

The radial bearing 13 that supports the first shaft portion 10A of the intermediate shaft main body 10 is integrally supported by a first bearing support unit 20 and a supporting member 18.

The first bearing support unit 20 is a member that has a tubular outer shape. A hollow region is radially inside the first bearing support unit 20. The radial bearing 13 is arranged in this region.

The supporting member 18 is a thick plate-shaped member that extends upward from the base 16. An open hole that is used to support the first bearing support unit 20 is disposed in the vicinity of the end portion on the upper side of the supporting member 18. The radial dimension of the open hole is set to be almost equal to the radial dimension of the outer periphery of the first bearing support unit 20. In other words, the outer peripheral surface of the first bearing support unit 20 is arranged to substantially abut against the inner peripheral surface of the open hole and the first bearing support unit 20 and the supporting member 18 are supported not to be detachable from each other with a fixing member (not illustrated) disposed.

Likewise, the radial bearing 14 and the thrust bearing 15 that support the second shaft portion 10B of the intermediate shaft main body 10 are integrally supported by a second bearing support unit 21 and a supporting member 19.

As is the case with the first bearing support unit 20, the second bearing support unit 21 is a member that is formed to have a tubular outer shape. The region radially inside the second bearing support unit 21 is hollow and the radial bearing 14 and the thrust bearing 15 are arranged in this region. The axial dimension of the second bearing support unit 21 is set to exceed the axial dimension of the first bearing support unit 20.

As is the case with the supporting member 18, the supporting member 19 is a thick plate-shaped member that extends upward from the base 16. An open hole that is used to support the second bearing support unit 21 is disposed in the vicinity of the end portion on the upper side of the supporting member 19. The radial dimension of the open hole is set to be almost equal to the radial dimension of the outer periphery of the second bearing support unit 21. Accordingly, the inner peripheral surface of the open hole and the outer peripheral surface of the second bearing support unit 21 are arranged to abut against each other and the second bearing support unit 21 and the supporting member 19 are supported not to be detachable from each other with a fixing member (not illustrated) disposed.

As described above with reference to FIG. 1, the oiling pipe 61, through which the lubricating oil flows, is connected to the radial bearings 13 and 14. The oiling pipe 61 extends in a substantially horizontal direction below the intermediate shaft main body 10. One of the end portions of the oiling pipe 61 is connected to the radial bearing 13 via the oiling pipe line 61C. Likewise, the other one of the end portions of the oiling pipe 61 is connected to the radial bearing 14 via the oiling pipe line 61D.

Accordingly, the lubricating oil is supplied to the radial bearings 13 and 14 via the oiling pipe lines 61C and 61D. After the radial bearings 13 and 14 are lubricated, the lubricating oil is discharged out of the radial bearings 13 and 14. The discharged lubricating oil flows toward a discharge pipe 62 that is connected to a wall surface of the exterior member 17 (described later).

The intermediate shaft main body 10 and the base 16 that have the above-described configuration are covered by the exterior member 17 which has the outer shape of a box. The exterior member 17 has a top plate 17A that is disposed above the intermediate shaft main body 10 and a first side wall portion 17B and a second side wall portion 17C that are connected substantially at right angles to both end edges of the top plate 17A and extend toward the base 16. In addition, wall surfaces are disposed on respective flat surfaces surrounded by longitudinal end edges of the top plate 17A and respective height-direction end edges of the first side wall portion 17B and the second side wall portion 17C. The discharge pipe 62 that extends forward in the drawing is connected to any one of the wall surfaces.

Two access holes H1 and H2 and a vent hole H3, which are opened or closed when maintenance is performed, are disposed in the top plate 17A. The access holes H1 and H2 are open hole portions that are disposed in the vicinity of both longitudinal end edges of the top plate 17A. The access holes H1 and H2 allow the inside and the outside of the top plate 17A to communicate with each other. The access holes H1 and H2 are blocked by hatches L1, L2 that have dimensions substantially equal to the dimensions of the open holes. The hatches L1 and L2 are fixed to end edges of the access holes H1 and H2 via bolts or the like. The access holes H1 and H2 are used mainly during the maintenance, inspection, or the like of bearing support units 20 and 21.

The vent hole H3 is an open hole portion that is disposed at the longitudinal center of the top plate 17A. The vent hole H3 allows the inside and the outside of the top plate 17A to communicate with each other. The vent hole H3 is blocked by a hatch L3 that has a dimension substantially equal to the dimension of the open hole. The hatch L3 is fixed to an end edge of the vent hole H3 via a bolt or the like. The vent hole H3 is opened mainly to inhibit the lubricating oil from leaking when the pressure in the intermediate shaft device 1 rises.

Hereinafter, effects of the rotary system 100 and the intermediate shaft device 1 that have the above-described configuration will be described.

When the compressor 80 is started by an external power source (not illustrated), the first rotary shaft 81 that is disposed in the compressor 80 begins to rotate. The rotation of the first rotary shaft 81 is transmitted to the first buffer shaft 11 via the first coupling 71.

The rotation of the first rotary shaft 81 transmitted to the first buffer shaft 11 is transmitted to the intermediate shaft main body 10 via the second coupling 72. Then, the rotation of the intermediate shaft main body 10 is transmitted to the second rotary shaft 91 of the turbine 90 via the third coupling 73. This allows the turbine 90 to rotate and an output to be supplied to an external instrument (not illustrated). In other words, the rotation of the compressor 80 is transmitted to the turbine 90 with little mechanical loss caused.

As described above, the first rotary shaft 81 of the compressor 80 and the second rotary shaft 91 of the turbine 90 can be connected to each other via the intermediate shaft main body 10 in the rotary system 100 according to this embodiment. Accordingly, the distance of separation between the compressor 80 and the turbine 90 can be appropriately maintained.

In a case where the compressor 80 and the turbine 90 are connected to each other not via the intermediate shaft device 1, for example, an appropriate distance cannot be maintained between the compressor 80 and the turbine 90. Then, instrument arrangement and maintenance are restricted with, for example, a sufficient space not being ensured when an external cable or pipe is laid.

In this embodiment, however, the intermediate shaft device 1 is disposed in the middle between the compressor 80 and the turbine 90, and thus an appropriate space can be obtained.

In addition, the intermediate shaft main body 10 of the intermediate shaft device 1 is supported by the bearing devices, that is, the radial bearings 13 and 14 and the thrust bearing 15. Accordingly, an unstable vibration of the intermediate shaft main body 10 can be effectively inhibited.

In addition, the large-diameter portion 10C is disposed in the region of the intermediate shaft main body between the radial bearings 13 and 14 in the intermediate shaft device 1 according to this embodiment. In addition, the large-diameter portion 10C is formed to be solid. Accordingly, the weight of the intermediate shaft main body 10 can be increased.

In a case where the intermediate shaft main body 10 is excessively light in weight, the gravitational load that acts on the radial bearings 13 and 14 and the thrust bearing 15 which support the intermediate shaft main body 10 is likely to be small. Then, the unstable vibration of the intermediate shaft main body 10 may occur in regions in the vicinity of the radial bearings 13 and 14 and the thrust bearing 15.

However, the large-diameter portion 10C described above is disposed in the intermediate shaft main body 10 according to this embodiment, and thus the unstable vibration of the intermediate shaft main body 10 occurring in the vicinity of the bearing devices can be inhibited.

The lubricating oil supply unit 60 of the intermediate shaft device 1 is connected to another lubricating oil supply unit of the compressor 80 and the turbine 90 via the oiling pipe 61 and the oil discharge pipe 62 as described above. Accordingly, the lubricating oil can be effectively and economically supplied to the intermediate shaft device 1 without having to provide a specific lubricating oil supply unit for the intermediate shaft device 1.

The intermediate shaft device 1 according to this embodiment has the exterior member 17. The exterior member 17 is formed to cover the entire intermediate shaft device 1. Accordingly, the lubricating oil is inhibited from scattering out of the intermediate shaft main body 10 and the bearing devices. In addition, maintenance-related safety and the like can be improved because the rotating intermediate shaft main body 10 does not have to be exposed to the outside.

The embodiment of the present invention has been described with reference to the accompanying drawings. The specific configuration is not limited to the embodiment and design changes or the like not departing from the scope of the present invention can also be included therein.

For example, the objects of application of the intermediate shaft device 1 are not limited to the compressor 80 and the turbine 90 and an electric motor or the like can also be used as the first rotary machine or the second rotary machine although the compressor 80 and the turbine 90 have been described as the first rotary machine and the second rotary machine of the rotary system 100 in this embodiment.

INDUSTRIAL APPLICABILITY

The intermediate shaft device according to the present invention can be applied to a rotary system that includes a rotary machine such as a gas turbine.

REFERENCE SIGNS LIST

1 Intermediate shaft device
10 Intermediate shaft main body
10A First shaft portion
10B Second shaft portion
11 First buffer shaft
12 Second buffer shaft
13 Radial bearing (bearing device)
14 Radial bearing (bearing device)
15 Thrust bearing (bearing device)
16 Base
17 Exterior member
17A Top plate
17B First side wall portion
17C Second side wall portion
18 Supporting member
19 Supporting member
20 First bearing support unit
21 Second bearing support unit
60 Lubricating oil supply unit
61A, 61B, 61C, 61D, 61E, 61F Oiling pipe line
62A, 62B, 62C, 62D, 62E, 62F Oil discharge pipe line
71 First coupling
72 Second coupling
73 Third coupling
74 Fourth coupling
80 Compressor
81 First rotary shaft
82 Radial bearing
83 Radial bearing
84 Thrust bearing
90 Turbine
91 Second rotary shaft
92 Radial bearing
93 Radial bearing 94 Thrust bearing
100 Rotary system
H1, H2 Access hole
H3 Vent hole
L1, L2, L3 Hatch
S Rotating body

The invention claimed is:

1. A rotary system comprising:
a first rotary machine including a first rotary shaft;
a second rotary machine including a second rotary shaft; and
an intermediate shaft device including:
an intermediate shaft main body having a first end portion connected to the first rotary shaft and a second end portion connected to the second rotary shaft and rotating about an axis; and
a pair of radial bearings slidably supporting a first shaft portion and a second shaft portion of the intermediate shaft main body, the first shaft portion being disposed at the first rotary shaft side of the intermediate shaft main body and including the first end portion, and the second shaft portion being disposed at the second rotary shaft side of the intermediate shaft main body and including the second end portion,
wherein a large-diameter portion of the intermediate shaft main body between the first shaft portion and the second shaft portion is solid,
wherein a radial dimension of the large-diameter portion of the intermediate shaft main body is greater than radial dimensions of the first shaft portion and the second shaft portion of the intermediate shaft main body which are supported by the pair of radial bearings, and
wherein the rotary system further comprising:
a lubricating oil supply unit supplying a lubricating oil to the pair of radial bearings, the lubricating oil supply unit being connectable to another lubricating oil supply unit of the first rotary machine and the second rotary machine, and
a box-shaped exterior member disposed to cover both the intermediate shaft main body and the pair of radial bearings.

2. The rotary system according to claim 1,
wherein a pair of radial bearings disposed apart from each other in the axial direction constitute the pair of radial bearings.

3. The rotary system according to claim 2,
wherein the second rotary machine is a turbine and further includes a thrust bearing disposed at a position contiguous to the second end portion.

4. The rotary system according to claim 1,
wherein the second rotary machine is a turbine and further includes a thrust bearing disposed at a position contiguous to the second end portion.

* * * * *